United States Patent [19]
Koning

[11] 3,843,945
[45] Oct. 22, 1974

[54] TEMPERATURE COMPENSATION OF ELECTROMAGNETIC DEVICE

[75] Inventor: Menno G. Koning, Dover, Mass.

[73] Assignee: Northrop Corporation, Los Angeles, Calif.

[22] Filed: June 14, 1973

[21] Appl. No.: 369,946

[52] U.S. Cl................. 335/217, 317/132, 310/266
[51] Int. Cl............................................. H01f 7/00
[58] Field of Search ........... 335/217, 223, 224, 225, 335/226, 299, 222; 317/132; 324/105; 336/179; 310/266

[56] References Cited
UNITED STATES PATENTS

| | | | |
|---|---|---|---|
| 1,724,405 | 8/1929 | Knight | 324/105 |
| 2,082,122 | 6/1937 | Rypinski | 335/217 X |
| 2,549,095 | 4/1951 | Huck | 317/132 X |
| 3,152,275 | 10/1964 | Aske | 310/266 |

Primary Examiner—George Harris
Attorney, Agent, or Firm—George W. Crowley

[57] ABSTRACT

A system for minimizing output linearity errors in an electromagnetic device which includes at least a coil. In a device such as a torquer, minimization of such errors is achieved by holding the torquer scale factor substantially constant over a temperature range by incorporating in the torquer parallel coil windings. Each coil includes one winding of material of a first temperature coefficient of resistance and a given number of turns combined in parallel with a second winding of material of a different temperature coefficient of resistance and a different number of turns.

5 Claims, 4 Drawing Figures

PATENTED OCT 22 1974 3,843,945

TEMPERATURE COMPENSATION OF ELECTROMAGNETIC DEVICE

BACKGROUND OF THE INVENTION

Linear output is highly desirable for accuracy in many devices such as meter movements, solenoids, actuators of various kinds, transducers and the like. It is of essential importance in torquers for gyroscopes for guidance systems where even infinitesimal errors are intolerable.

Typically, in gyroscope applications, the torquer is a permanent-magnet, moving-coil device consisting of a plurality of movable coils disposed in air gaps between stationary permanent-magnets and an outer casing or magnetic structure which serves as a magnetic return path.

The torque generated by the torquer depends principally on the flux in the air gaps and that torque changes with temperature because the flux is determined by the strength of the permanent magnets, magnet gap geometry, leakage flux distribution, radius of coil location, etc., all of which change with temperature. In addition the torquer scale factor of a final instrument may change as a result of changes in parameters that vary with temperature. For instance the torquer scale factor in a gyro changes with temperature as a result of the variation in angular momentum of the gyro wheel because its radius of gyration expands with temperature.

Obviously, some system or method for coping with temperature variations is required if precise linear torquing is to be achieved.

Some efforts have been made to provide temperature compensation in other somewhat similar environments, but they are based upon principles different from those underlying the present invention. In one known system, two pairs of temperature compensating coils are used to achieve compensation of "search" coils. The coils of each compensating pair have the same number of turns and are connected in series opposition. Each pair of compensating coils is located geometrically adjacent to one of the two search coils to be compensated and the pair of coils and its corresponding search coil are connected in different arms of an electrical bridge circuit. Thus, each pair of temperature compensating coils experiences the same temperature as its corresponding search coil. The search coil and the corresponding pair of compensating coils must have the same effective resistivity coefficients so that changes in resistance of the search coil with temperature will be balanced by equal changes in the combined resistance of the pair of compensating coils which are located in an adjacent arm of the bridge. The combined resistance of each pair of compensating coils equals the resistance of its corresponding search coil to provide balance when the system is not activated.

Any resistive imbalance introduced by a temperature difference between the search coils is automatically offset by an equal change in resistance of the temperature compensating coils located in the adjacent bridge arm, maintaining null output of the bridge. However, imbalances in search coil currents which arise from fluctuations in magnetic geometry cannot be compensated by this method, and, furthermore, the added components render the system complex and costly.

Another method of temperature compensation also utilizes a bridge circuit in which a main coil to be compensated is split into two equal parts which are then incorporated in opposite arms of a bridge circuit. A temperature compensating coil or auxiliary coil is wrapped about both parts of the main coil and is connected across a diagonal of the bridge. Resistances of the two remaining bridge coils are then chosen so that the bridge is balanced; that is, of such value that the auxiliary is unexcited at the mean operating temperature of the device. When the temperature changes so that the resistance of the main winding rises or falls the bridge becomes unbalanced and current flows in the auxiliary winding. This current generates a magneto-motive force aiding or opposing the magneto-motive force in the main winding so as to restore the latter to the initial value of the bridge under balanced conditions.

Although the approaches of the prior art are effective in certain special circumstances, for ease and economy of construction it is desirable to achieve needed temperature compensation with the least amount of equipment. This is of prime importance in a unit for gyroscopic guidance applications. Therefore an object of this invention is to simplify temperature compensating systems and eliminate complex circuitry and the need for precise adjustments. It is a further object of this invention to compensate for all effects of temperature change not only on all magnetic circuit parameters including magnetic gap width, leakage flux distribution, core permeability, radius of coil location and the like, but also on all other parameters that effect a change in torquer scale factor.

SUMMARY OF THE INVENTION

In its preferred form, the present invention is embodied in a torquer in which the winding of each conventional moving coil is supplemented by a parallel winding having a different number of turns and a different temperature coefficient of resistance. The total current entering the shunt arms of the coil varies as temperature changes affect the various elements noted above. However, the total current is divided into two separate currents as determined by the respective resistances of the parallel pair or paris of windings and, by an appropriate choice of winding materials and numbers of turns, torquer scale factor may be held substantially unchanged. In this manner, the necessity for complex bridge circuitry is avoided. Rather than feeding back a magneto-motive force which is generated by separate compensating coils or an auxiliary coil in a bridge circuit to restore the magneto-motive force in the main coil, the present invention employs the complementary properties of two coils of specific design to compensate for all linearity errors arising from fluctuations in temperature.

BRIEF DESCRIPTION OF THE DRAWINGS

Referring to the drawing in which is illustrated a preferred embodiment of the invention.

DESCRIPTION OF THE PREFERRED EMBODIMENT

Before considering the appended drawings in detail, understanding of the present invention may be facilitated by a review of the following mathematical and physical considerations. Typically, a permanent-magnet, moving-coil torquer, as used in a gyroscope, consists of one or more coils of wire that are located within the gaps between permanent magnets and associated magnetic structures. Linear torquer output is had when torquer scale factor is held constant.

The torquer scale factor may be defined by:

$$TSF = n \cdot a \cdot l \cdot W \cdot B / 10 \cdot H \text{ Rad/Sec/Ampere},$$

where:
- $n$ = number of coils.
- $a$ = radius at which coils are located, in cm.
- $l$ = active conductor length, in cm.
- $W$ = number of conductors per coil.
- $B$ = magnetic flux density in the gap, in gauss.
- $H$ = angular momentum of gyro wheel, in gram cm²/sec.

The torquer scale factor changes because, as the temperature changes, changes occur in the strength of permanent magnets, and in magnetic gaps, leakage flux distribution, radius of coil location, angular momentum of gyro wheel, and the like.

The torque T can be expressed as:

$$T = i \cdot W \cdot K \cdot (1 - \gamma t) \text{ dyne cm},$$

where:
- $K$ = constant as determined from nominal values of $n$, $a$, $l$, $B$ and $H$.
- $\gamma$ = coefficient of $K$ as it changes with temperature from a nominal value to yield a constant torquer scale factor.
- $t$ = temperature.

From the expression above it follows that the torquer scale factor can be held constant if the product of $i \cdot W$ and $1 - \gamma t$ is kept constant. This can be done, or at least closely approximated, by using a method where the conventional windings of copper wire are augmented in parallel with additional windings of wire with a material that has a different temperature coefficient of resistance. Alternatively, of course independently designed parallel windings could be originally installed. Conceivably, compensation may be had with two or more materials that have different temperature resistance coefficients and the same number of turns. However, it is more practical to use different numbers of turns as well as different materials. The relationships between coefficients of resistance of the materials and the number of turns as they are involved with other parameters can be derived from the following as it is shown in FIG. 1 for a specific torquer.

Figure 1:
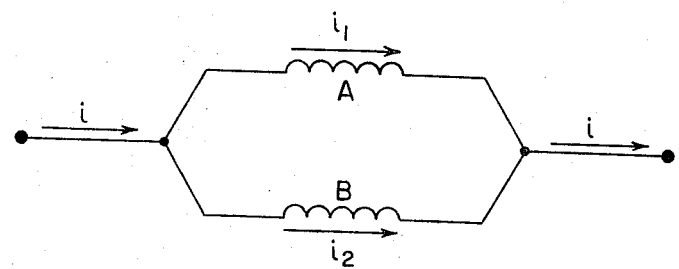
FIG. 1 is a schematic representation of a typical torquer coil embodying the present invention.

In FIG. 1, the coil identified as COIL A may be a conventional torquer coil or any coil of predetermined characteristics. Connected in shunt with COIL A is an additional coil, identified as COIL B. COIL A has a given number of turns and is formed of material having temperature coefficient of resistance differing from those of COIL B as explained in greater detail hereinbelow. However, assuming the flow of a total current $i$ in the combination of COIL A and COIL B, it is divided into currents $i_1$ and $i_2$ flowing in COIL A and COIL B, respectively.

Each of the currents $i_1$ and $i_2$ varies directly with the resistance of the opposite branch and inversely with the resistance of the branch of the parallel circuit in which it flows. By choosing coils such that the number of turns $N_1$, the coil resistance at room temperature $R_1$, and the resistivity coefficient $\alpha$ of a COIL A differ respectively from the number of turns $N_2$, the coil resistance at room temperature $R_2$ and the resistivity coefficient $\beta$ of the COIL B, the torque generated by the coils may be maintained at a substantially constant level or at a level that changes in pre-determined relationship with temperature despite changes in the electromagnetic circuit parameters with temperature.

Stated otherwise, for a certain required torque level, the current $i$ divides into two currents $i_1$ and $i_2$ as governed by the resistances of COILS A and B by the relationship:

$$i_2 = i_1 R_{1t}/R_{2t}$$

where $R_{1t}$ is resistance of COIL A at temperature $t$; and $R_{2t}$ is resistance of COIL B at temperature $t$.

Then, assuming that:
- $\alpha$ = temperature coefficient of resistance of the material of COIL A;
- $\beta$ = temperature coefficient of resistance of the material of COIL B;
- $W_1$ = number of turns of COIL A;
- $W_2$ = number of turns of COIL B;
- $R_1$ = resistance of COIL A at room temperature; and
- $R_2$ = resistance of COIL B at room temperature; if $W_1/W_2 = P$ and $R_1/R_2 = Q$;

to satisfy the requirement for a constant torquer scale factor with temperature:

$$(i_1 W_1 + i_2 W_2) K \cdot (1 - \gamma t) = \text{constant} = C_1 \tag{1}$$

$$\therefore (i_1 P W_2 + i_2 W_2) K (1 - \gamma t) = C_1$$

or $$W_2 (P i_1 + i_2) K (1 - \gamma t) = C_1$$

Thus, for a given level of torquer strength:

$$(P i_1 + i_2)(1 - \gamma t) = \text{constant} = C_2 \tag{2}$$

$$i_2 = i - i_1 \quad i_2 = i_1 R_{1t}/R_{2t}$$

$$\therefore i_1 = \frac{i}{1 + \frac{R_{1t}}{R_{2t}}}$$

$$i_2 = \frac{i}{1 + \frac{R_{2t}}{R_{1t}}}$$

Substituting in (2)

$$\left\{ \frac{P}{1+\frac{R_{1t}}{R_{2t}}} + \frac{1}{R+\frac{R_{2t}}{R_{1t}}} \right\} (1 - \gamma t) \pm C_2 \tag{3}$$

Also:

$$R_{1t} = R_1(1 + \alpha t) \text{ and } R_{2t} = R_2(1 + \beta t)$$

Substituting in (3):

$$\left\{ \frac{P}{1 + \frac{R_1(1+\alpha t)}{R_2(1+\beta t)}} + \frac{1}{\frac{R_2(1+\beta t)}{R_1(1+\alpha t)}} \right\}(1 - \gamma t) = C_2$$

or, because $Q = R_1$ and rearranging:

$$\{P(1+\beta t) + Q(1+\alpha t)/(1+\beta t) + Q(1+\alpha t)\}(1-\gamma t) = C_2 \quad (4)$$

From equation (4) it follows that the torquer scale factor can be optimized for minimum variation over a required temperature range when the values of $P$ and $Q$ are selected in proper relationship to $\alpha$, $\beta$ and $\gamma$. For simplicity, the condition under which substantially constant torquer scale factor is achieved in accordance with the foregoing is termed that wherein the parallel coil portions or windings are "complementary in constant torquer scale factor." With the aid of a small computer, a large number of combinations of practical materials and wire sizes have been successfully put into practice. Depending upon such restrictions as available space, geometry of the device, environment of application and the like, an almost unlimited number of complementary combinations is feasible.

Figure 2:
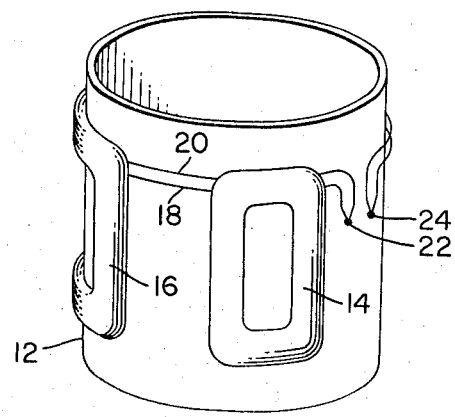
FIG. 2 is a perspective view of a torquer sleeve assembly of the preferred embodiment of the present invention.

In FIG. 2 there is shown a cylindrical torquer sleeve 12 which may be made of any suitable nonmagnetic material such as aluminum. Three dual coils are wound, formed into arcuate shapes and cemented about its periphery in equally spaced positions. Visible in FIG. 2 is an entire dual coil 14 and a portion of a dual coil 16 the third coil being invisible in this view. There also may be seen between the coils 14 and 16 the wires from which the coils are wound as well as the terminals 22 and 24 by which the coils are energized. Although the interconnection of the third coil 17 is not visible in FIG. 2, it is similar to that shown between the coils 14 and 16.

Figure 3:
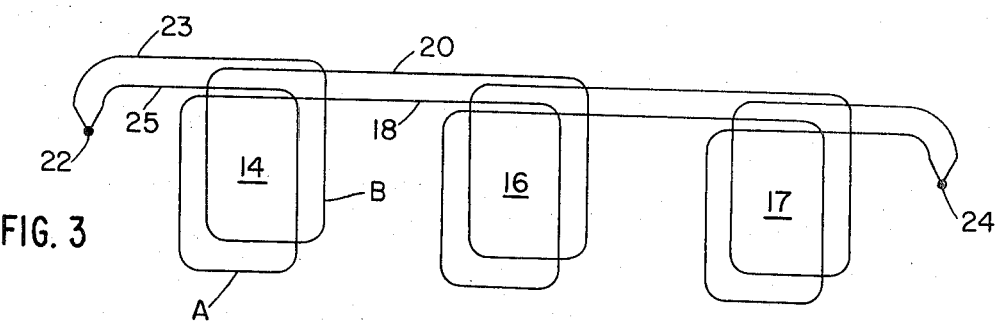
FIG. 3 is a winding diagram of the coils wound on the torquer sleeve assembly of FIG. 2.

In FIG. 3, the winding and interconnection of the coils is made obvious. In this view, the three coils are laid out schematically in such fashion that the direction of winding and the interconnections may be clearly seen. The terminal 22 at the left has the two basic coil wires 23 and 25 welded, brazed or otherwise electrically connected to it. The wires 23 form one portion of the dual coils 14 and 16 as well as the coil 17 referred to but not visible in FIG. 2. The wire 25 forms the second portion of each of the coils 14, 16 and 17 and both wires are brazed or otherwise suitably electrically connected to the electrical terminal 24. Although for convenience, only three dual coils and single windings are shown, in a practical embodiment, a different situation obtains. In a specific example, each of the coil portions formed of the wire 23 is actually 144 turns of No. 39 copper wire. The total resistance of the three coil portions is 45.09 ohms at 74° F. Each coil portion formed from the wire 25 is actually 212 turns of No. 39 coin silver wire and the total resistance of the three coil portions is 86.91 ohms at 74° F. With such a set of dual coils, the total parallel resistance is 29.65 ohms at 74° F. In a typical gyroscope application, the coils are of the order of 0.6 inches long and 0.4 inches wide.

Figure 4:
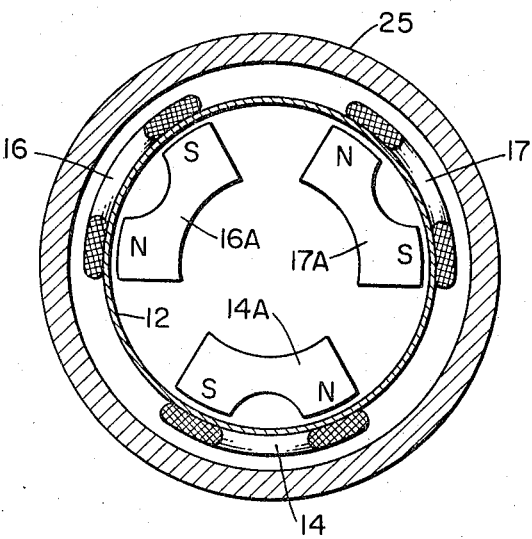
FIG. 4 is a cross-sectional view of a torquer assembly of the preferred embodiment.

The coefficient $\gamma$ referred to above may be empirically determined by measuring the output of an electromagnetic device over a desired range of temperature. Then, through the use of the equations developed above, and with the aid of a small computer, practical materials and sizes can be selected for the wires of the coils and numerous combinations can be successfully utilized in the coils. Although the present invention is applicable for temperature compensation in numerous devices such as transducers, meter movements, solenoids, actuators etc., and although it can also be applied with moving-coil, moving-magnet or moving-armature configurations, a particular gyroscope torquer has been shown in FIG. 4 where the invention is of considerable value and significance. Again, the torquer sleeve 12 is shown as are the dual coils 14, 16 and 17. Three magnets 14a, 16a and 17a having suitably configured poles cooperate with the coils 14, 16 and 17 respectively. Surrounding the entire assembly of magnets, torquer sleeve and coils is an outer case 25, preferably made of magnetic material to provide a return path to the magnets. In such an installation, the torquer sleeve 12 is usually attached to the gimbal of a gyroscope to provide the desired torquing action.

What has been described is a preferred embodiment of the invention and utility of the invention in other applications has been noted. It should further be noted that the invention is operable with either direct or alternating current systems and that it is possible to connect the coil windings such that the torque developed is not additive, but in opposition, if such an output is desired. Basically, the invention is useful wherever it is desired to compensate for changes or variations which occur with changes of temperature in electromagnetic devices.

What is claimed is:

1. In an electromagnetic device having a generator of electrodynamic force which includes at least a first coil composed of material having a known temperature coefficient of resistance, said first coil having a known number of turns, apparatus for minimizing variations in said electrodynamic force caused by fluctuations of temperature over a predetermined range of temperature comprising a second coil wound in parallel with said first coil, said second coil being compressed of material having a temperature coefficient of resistance and having a number of turns different from those of said first coil, said second coil and said first coil being complementary in constant torquer scale factor over said predetermined range of temperature.

2. In an electromagnetic device as defined in claim 1, the apparatus for minimizing variations in electromagnetic force at a given temperature t wherein the temperature coefficient of resistance of the material of said first coil is $\alpha$ and the temperature coefficient of resistance of the material of said second coil is $\beta$, the ratio of the number of turns of the first coil to the number of turns of the second coil is $P$, and the ratio of the resistance of said first coil to the resistance of said second coil at said given temperature t is $Q$ which satisfies the equation:

$$\{P(1+\beta t) + Q(1+\alpha t)/(1+\beta t) + Q(1+\alpha t)\}(1-\gamma t)$$
$$= \text{constant}.$$

3. In an electromagnetic device which includes a torquer apparatus for minimizing output linearity errors over a predetermined temperature range which comprises a first coil having a first number of turns of material having a first temperature coefficient of resistance and a second coil wound in parallel with said first coil, said second coil having a second number of turns of material having a second temperature coefficient of resistance, said first and second numbers of turns and said first and second materials being of values such that said first and second coils are complementary in constant torquer scale factor.

4. In an electromagnetic device as defined in claim 3, the combination wherein said first coil comprises 144 turns of No. 39 copper wire and said second coil comprises 212 turns of No. 39 coin silver wire.

5. In an electromagnetic device as defined in claim 1, the combination which includes a torquer scale of nonmagnetic material, said first coil and said second coil each being formed into three equal portions and attached symmetrically to the peripheral surface of said sleeve, three bipolar magnets being similarly symmetrically disposed within said sleeve for cooperation with turns of said coils to produce torquer and an outer case of magnetic material surrounding said sleeve and said coils to provide a return path for said magnets.

* * * * *

PO-1050
(5/69)

UNITED STATES PATENT OFFICE
CERTIFICATE OF CORRECTION

Patent No. 3,843,945                         Dated 10/22/74

Inventor(s) Menno G. Koning

It is certified that error appears in the above-identified patent and that said Letters Patent are hereby corrected as shown below:

In column 2, line 25

Insert the word "bridge" between the words

"complex" and "circuitry"

In column 6, line 48

Replace the word --compressed-- with the word "composed"

Signed and sealed this 14th day of January 1975.

(SEAL)
Attest:

McCOY M. GIBSON JR.                C. MARSHALL DANN
Attesting Officer                  Commissioner of Patents